United States Patent
Chaudhari et al.

(10) Patent No.: US 11,074,186 B1
(45) Date of Patent: Jul. 27, 2021

(54) LOGICAL MANAGEMENT OF A DESTAGE PROCESS AND DYNAMIC CACHE SIZE OF A TIERED DATA STORAGE SYSTEM CACHE THAT IS CONFIGURED TO BE POWERED BY A TEMPORARY POWER SOURCE DURING A POWER LOSS EVENT

(71) Applicant: International Business Machines Corporation, Armonk, NY (US)

(72) Inventors: Ganesh Govindrao Chaudhari, Pune (IN); Kushal Patel, Pune (IN); Sachin Chandrakant Punadikar, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/742,739

(22) Filed: Jan. 14, 2020

(51) Int. Cl.
  *G06F 12/0871* (2016.01)
  *G06F 12/0811* (2016.01)
  *G06F 1/30* (2006.01)
  *G06F 11/30* (2006.01)
  *G06F 12/0873* (2016.01)

(52) U.S. Cl.
  CPC ........... *G06F 12/0871* (2013.01); *G06F 1/30* (2013.01); *G06F 11/3037* (2013.01); *G06F 11/3058* (2013.01); *G06F 12/0811* (2013.01); *G06F 12/0873* (2013.01)

(58) Field of Classification Search
  CPC .................................................. G06F 12/0871
  USPC ........................................................ 711/154
  See application file for complete search history.

(56) References Cited

U.S. PATENT DOCUMENTS

| | | | |
|---|---|---|---|
| 7,100,080 B2 | 8/2006 | Howe | |
| 7,370,163 B2 | 5/2008 | Yang et al. | |
| 8,990,502 B2 | 3/2015 | Koltsidas et al. | |
| 9,588,565 B1 | 3/2017 | Harland et al. | |
| 9,734,067 B1* | 8/2017 | Bruce | G06F 11/1076 |
| 2004/0190210 A1* | 9/2004 | Leete | G06F 11/1456 361/90 |
| 2005/0071550 A1 | 3/2005 | Lowe et al. | |
| 2006/0212651 A1 | 9/2006 | Ashmore | |
| 2007/0250660 A1* | 10/2007 | Gill | G06F 12/0804 711/103 |

(Continued)

FOREIGN PATENT DOCUMENTS

WO    2007018779 A1    2/2007

OTHER PUBLICATIONS

Rouse et al., "tiered storage," TechTarget, Oct. 2018, 8 pages, retrieved from https://searchstorage.techtarget.com/definition/tiered-storage.

*Primary Examiner* — Jae U Yu
(74) *Attorney, Agent, or Firm* — Zilka-Kotab, P.C.

(57) ABSTRACT

A computer-implemented method according to one embodiment includes managing a cache in a tiered data storage system. The cache is configured to be powered by a temporary power source during a power loss event. The managing includes determining an amount of time that the temporary power source is capable of powering the cache before the temporary power source is depleted, and maintaining a dynamic cache size. The maintaining includes dynamically selecting the cache size based on the amount of time that the temporary power source is capable of powering the cache before the temporary power source is depleted, and based on a latency of destaging extents of data in the cache.

20 Claims, 8 Drawing Sheets

(56) References Cited

U.S. PATENT DOCUMENTS

2009/0077312 A1   3/2009   Miura
2009/0135700 A1   5/2009   Fujibayashi
2017/0024297 A1   1/2017   Sogabe

* cited by examiner

LOGICAL MANAGEMENT OF A DESTAGE PROCESS AND DYNAMIC CACHE SIZE OF A TIERED DATA STORAGE SYSTEM CACHE THAT IS CONFIGURED TO BE POWERED BY A TEMPORARY POWER SOURCE DURING A POWER LOSS EVENT

BACKGROUND

The present invention relates to tiered data storage systems, and more specifically, this invention relates to logical management of a destage process and dynamic cache size of a tiered data storage system cache that is configured to be powered by a temporary power source during a power loss event.

Data is often stored on different types of hardware. For example, some data storage solutions, also known as tiered data storage systems, may include a plurality of different types of storage mediums, e.g., non-volatile random access memory (NVRAM) such as flash memory, hard disks, magnetic recording tape, etc. The multi-tiered aspect of a tiered data storage systems is a technique which allows for categorization of application data, and association of such data with various storage media with the objective of reducing the total cost of storage.

In some approaches, data in a tiered data storage system may be categorized/assigned in a hierarchy according to the business value of such data. Tiers may be determined based on performance and cost of the media, and data may be ranked according to how often users access it. Generally, extents of data determined to have a relatively greatest importance, e.g., relatively most frequently used, is served from storage media of the tiered data storage system having relatively lowest read/write latencies. However, such storage media is typically relatively expensive.

Some configurations of tiered data storage systems additionally and/or alternatively utilize NVRAM storage for extents of data that are determined to have a relatively greatest importance, while other data may be written to secondary storage, e.g., hard disk, magnetic tape, cloud storage, etc. Generally, in such configurations, relatively low latency tiers are associated with relatively higher storage costs, while other storage tiers are associated with high capacity and moderate latency. In some approaches, data that is to be stored for the foreseeable future may be stored in an archive tier.

SUMMARY

A computer-implemented method according to one embodiment includes managing a cache in a tiered data storage system. The cache is configured to be powered by a temporary power source during a power loss event. The managing includes determining an amount of time that the temporary power source is capable of powering the cache before the temporary power source is depleted, and maintaining a dynamic cache size. The maintaining includes dynamically selecting the cache size based on the amount of time that the temporary power source is capable of powering the cache before the temporary power source is depleted, and based on a latency of destaging extents of data in the cache.

A computer program product for logical management of a destage process and dynamic cache size of a cache of a tiered data storage system according to another embodiment includes a computer readable storage medium having program instructions embodied therewith. The program instructions are readable and/or executable by a controller to cause the controller to perform the foregoing method.

A computer-implemented method according to another embodiment includes performing a destaging process in response to determining that a power loss event has occurred in a tiered data storage system that includes a cache that is configured to be powered by a temporary power source during a power loss event. The destaging process includes determining which extents of data are stored on both a tier having relatively lower write latency and a tier having relatively higher write latency. The destaging process further includes, for each extent of data determined to be stored on both tiers, making a write location on which the extent of data is stored on the tier having the relatively lower write latency available for writing extents of data in the cache to during the destaging process.

Other aspects and embodiments of the present invention will become apparent from the following detailed description, which, when taken in conjunction with the drawings, illustrate by way of example the principles of the invention.

DETAILED DESCRIPTION

Figure 1:
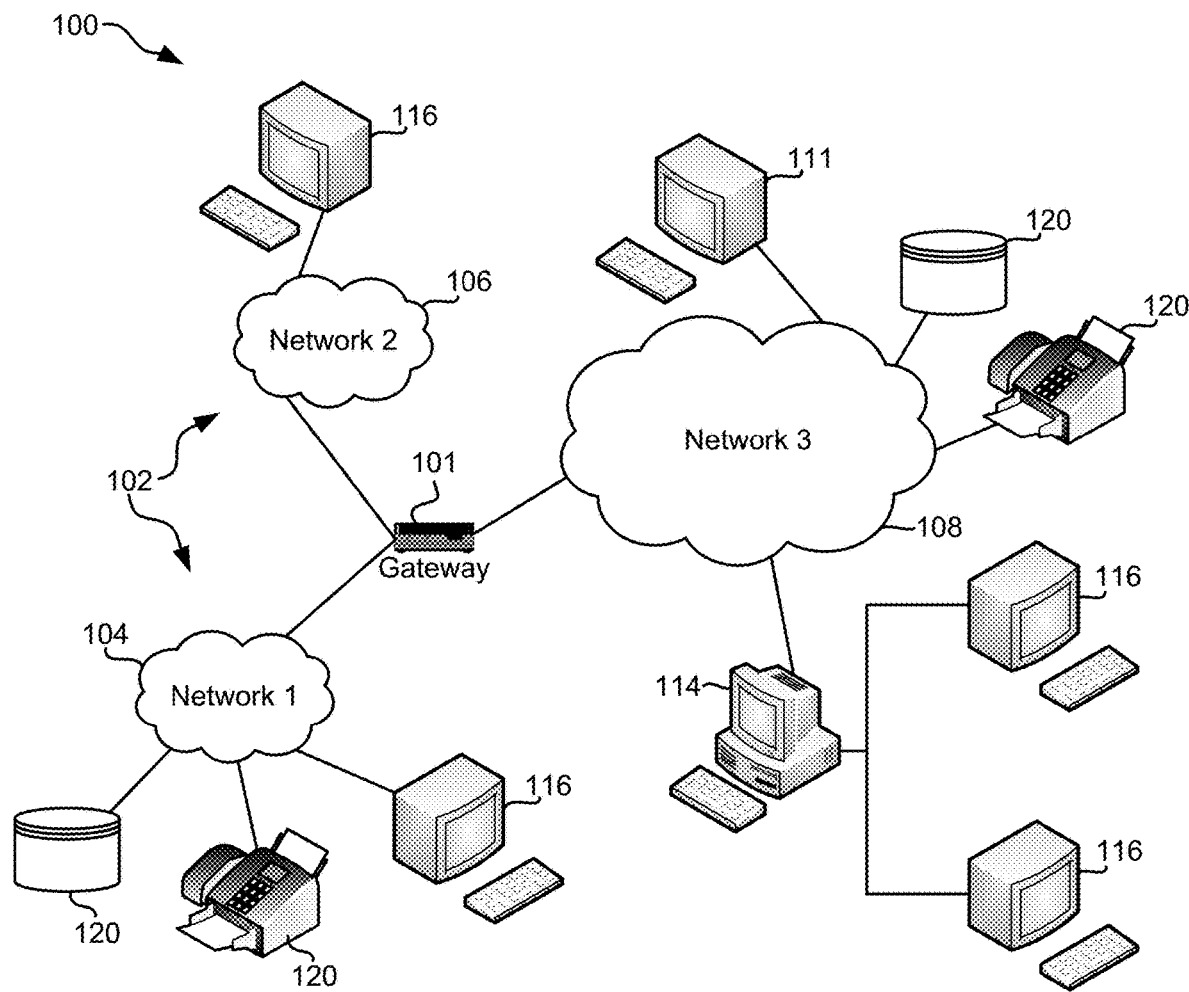
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for logical management of a destage process and dynamic cache size of a tiered data storage system cache that is configured to be powered by a temporary power source during a power loss event.

In one general embodiment, a computer-implemented method includes managing a cache in a tiered data storage system. The cache is configured to be powered by a temporary power source during a power loss event. The managing includes determining an amount of time that the temporary power source is capable of powering the cache before the temporary power source is depleted, and maintaining a dynamic cache size. The maintaining includes dynamically selecting the cache size based on the amount of time that the temporary power source is capable of powering the cache before the temporary power source is depleted, and based on a latency of destaging extents of data in the cache.

In another general embodiment, a computer program product for logical management of a destage process and dynamic cache size of a cache of a tiered data storage system includes a computer readable storage medium having program instructions embodied therewith. The program instructions are readable and/or executable by a controller to cause the controller to perform the foregoing method.

In another general embodiment, a computer-implemented method includes performing a destaging process in response to determining that a power loss event has occurred in a tiered data storage system that includes a cache that is configured to be powered by a temporary power source during a power loss event. The destaging process includes determining which extents of data are stored on both a tier having relatively lower write latency and a tier having relatively higher write latency. The destaging process further includes, for each extent of data determined to be stored on both tiers, making a write location on which the extent of data is stored on the tier having the relatively lower write latency available for writing extents of data in the cache to during the destaging process.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
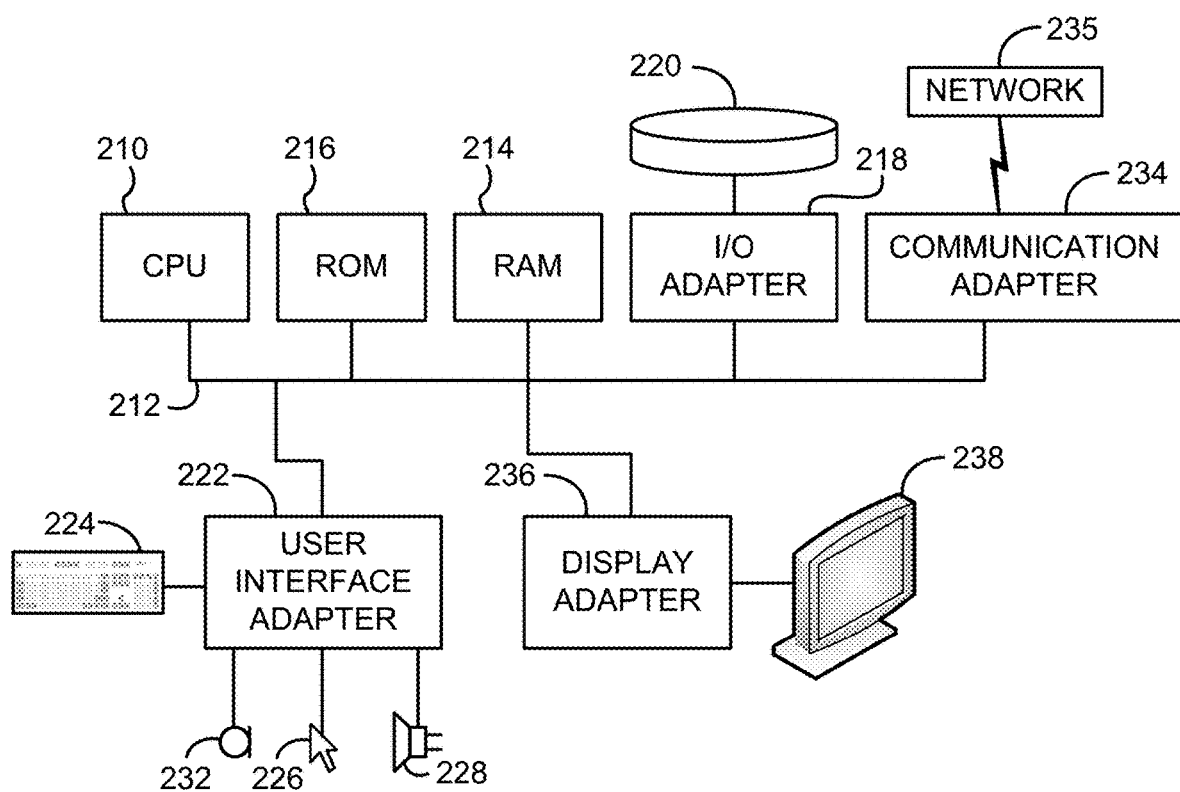
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
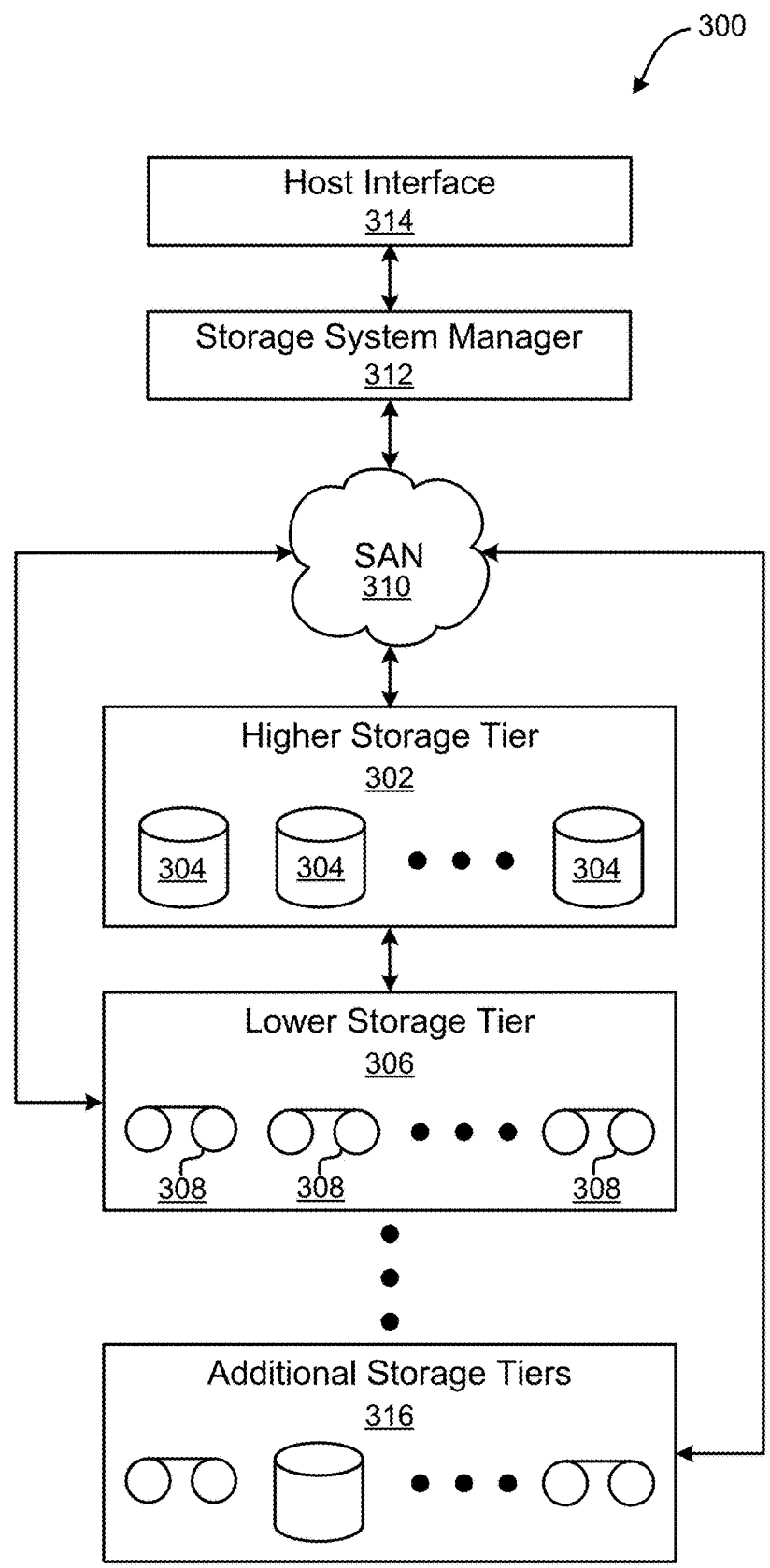
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere herein, in some approaches, data in a tiered data storage system may be categorized/assigned in a hierarchy according to the business value of such data. Tiers may be determined based on performance and cost of the media, and data may be ranked according to how often users access it. Generally, extents of data determined to have a relatively greatest importance, e.g., relatively most frequently used, is served from storage media of the tiered data storage system having relatively lowest read/write latencies. However, such storage media is typically relatively expensive.

Some configurations of tiered data storage systems additionally and/or alternatively utilize NVRAM storage for extents of data that are determined to have a relatively greatest importance, while other data may be written to secondary storage, e.g., hard disk, magnetic tape, cloud storage, etc. Generally, in such configurations, relatively low latency tiers are associated with relatively higher storage costs, while other storage tiers are associated with high capacity and moderate latency. In some approaches, data that is to be stored for the foreseeable future may be stored in an archive tier. As extents of data of a tiered data storage system are accessed, data may be transferred to-and-from disk storage or other lower-tier storage. This process may involve storing the data temporarily in volatile cache memory. In some approaches, the cache may be comprised of high-speed silicon memory dynamic random-access memory (DRAM) chips. In some data storage system configurations, based on cache memory being volatile in nature, the data storage systems may include an additional power supply attached to the cache, which may be used to save application write data present in the cache in the event of a power loss event, e.g., such as an external power loss event. This additional power source may provide an uninterrupted power supply upon primary power sources failing to power the data storage system. More specifically, upon a power loss event being detected, the additional power supply may be used to dump cached contents to persistent storage. This allows the data storage system to be shut down gracefully, e.g., without suddenly losing contents that are stored in the cache as a result of a primary power source becoming non-functional. Moreover, this allows data storage systems to be provided with the advantage of cache memory for write workloads. In a typical posted-write operation, as soon as the host computer writes data to the cache, the write operation is completed, and the host is freed-up immediately to perform another operation. The host does not have to wait for the write data to be transferred to disk. Accordingly, implementation and utilization of cache memory in a tiered data storage system may enable relatively faster write operations and an increased overall system performance.

Upon a data write being completed, it is important that data stored in a cache is protected before such data is written out to one or more drives. This is because data that is stored on a cache will be unrecoverable in the event of the cache losing power before the write data is moved to the drives. Accordingly, as will be described in greater detail elsewhere herein, in response to an external power source to a data storage system that includes a cache being interrupted, a temporary power source may be used to power the cache until the cached contents of a cache are flushed (destaged) to another storage location. The flushing of cached data may be performed in order to preserve the integrity of business-critical information. Depending on the capacity of a temporary power source when external power is lost, battery-backed cache is typically capable of retaining the integrity of data in the cache for sufficient time to flush the data. In the event that an unexpected external power outage occurs while data is held in the cache, a controller may initiate a flushing of such data to persistent storage due to the cache not being a persistent storage type. Implementations of caches that are configured to be powered by a temporary power source may vary according to any one or more factors, e.g., according to a type of temporary power source that is used, according to usable capacity of the temporary power source, according to the simplicity of data recovery in the event of external power loss, etc. However, there are also a plurality of variables that may impact a duration that a temporary power source is able to power a cache, such as, e.g., an age of the temporary power source, a temperature of an environment in which the temporary power source is located and/or used, capacity memory effect, accuracy of measuring remaining capacity, etc.

The storage capacity of some conventional caches may be configured to be adjusted. However, as indicated above, multiple factors can reduce battery capacity over time, which may result in bottlenecking of cached data that is destaged during a power loss event. In some conventional configurations of data storage systems having two storage nodes, where both of the storage nodes are connected to the same external power source (which is very likely in a single datacenter cluster present over neighboring server racks), there is relatively high probability that both of such nodes will lose power from the external power source at the same time. Accordingly, any functionality issues that may exist in a temporary power source that is configured to power a cache may cause data losses. In the data storage industry, such losses are particularly problematic where customer data is lost.

Various embodiments and approaches described herein include techniques for logical management of a destage process and dynamic cache size of a tiered data storage system cache that is configured to be powered by a temporary power source during a power loss event. The cache in the various embodiments may include any type of known cache memory.

Figure 4:
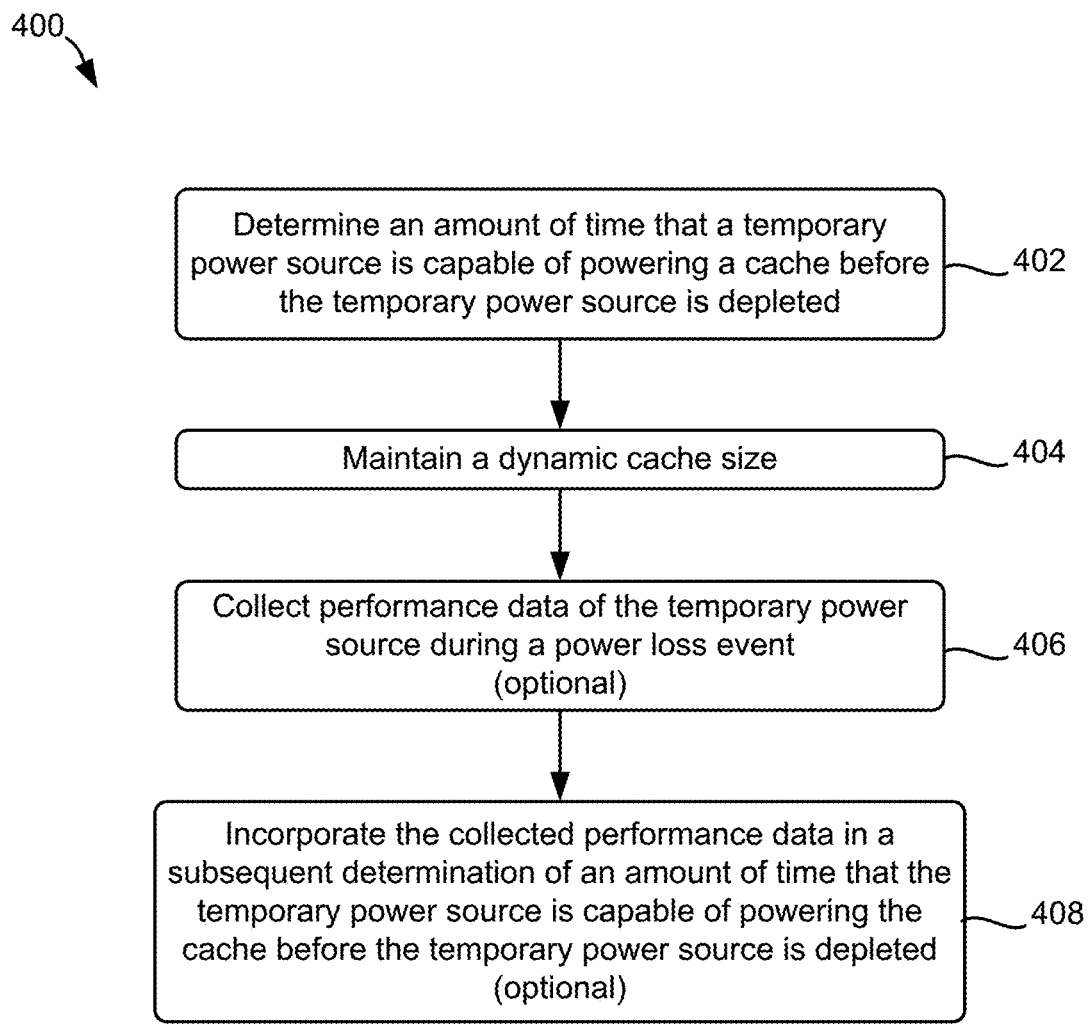
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3 and 6-7C, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 400 may be utilized for maintaining a cache in in a tiered data storage system. More specifically, method 400 may be utilized for maintaining a dynamic cache size of a cache that is configured to be powered by a temporary power source during a power loss event. As will be described elsewhere below, the dynamic cache size preferably prevents the cache from accumulating an amount of data that is not capable of being destaged from the cache before a temporary power source that powers the cache is depleted during a power loss event.

In some approaches, managing the cache includes determining an amount of time that the temporary power source is capable of powering the cache before the temporary power source is depleted, e.g., see operation 402 of method 400. Determining the amount of time that the temporary power source is capable of powering the cache before the temporary power source is depleted may include one or more operations, depending on the approach. For example, in one approach, the determination may include considering prior discharge times of the temporary power source and/or considering prior discharge times of another temporary power source of a similar type. In such an example, for context, the term "similar" may refer to two temporary power sources that, e.g., are of the same type, have about the same power retention thresholds, have been discharged within a predetermined number of times from the other, etc.

According to another example, determining the amount of time that the temporary power source is capable of powering the cache before the temporary power source is depleted may additionally and/or alternatively include performing a test discharge on the temporary power source, e.g., such as during a scheduled downtime of the tiered data storage system and/or while another power source is configured to power the cache during a power loss event.

Operation 404 of method 400 includes maintaining a dynamic cache size. As will be described below, the dynamic cache size is preferably maintained by ongoingly considering the destaging resources available in tiers of the tiered data storage system, and dynamically adjusting the cache size such that an attainable time for destaging the cache using such resources is at any given time not greater than a time that the temporary power source is determined to be capable of powering the cache. This ensures that contents of the cache can be destaged before the temporary power source is depleted. Accordingly, the cache size may sometimes be set to include only a portion of the total storage size of the storage nodes that exist in the cache.

In some approaches, maintaining the dynamic cache size may include dynamically selecting the cache size based on the amount of time that the temporary power source is capable of powering the cache before the temporary power source is depleted. The dynamic cache size is preferably less than a size that would accommodate extent(s) of data that cannot be written to available write locations of the tiered data storage system before the temporary power source is depleted. This is because allowing the dynamic cache size to reach a size that some data cannot be destaged before a temporary power source that is powering the cache becomes depleted may result in data being lost in a power loss event. Accordingly, in some approaches, method 400 may include decreasing the dynamic cache size in response to a determination that an estimated time for writing of extents of data from the cache to available write locations in the tiered data storage system is greater than an estimated amount of time that the temporary power source is capable of powering the cache before the temporary power source is depleted. Moreover, in another approach, method 400 may include increasing the dynamic cache size in response to a determination that the estimated time for writing of extents of data from the cache to available write locations in the tiered data storage system is less than an estimated amount of time that the temporary power source is capable of powering the cache before the temporary power source is depleted. In one or more of such approaches, the increasing and/or decreasing may be in any increment of cache size, e.g., a predetermined amount, an amount that is proportional to the amount of data that would not be written before depletion of the power source, an amount that is proportional to the amount of resources of the temporary power source that are expected to remain after writing extents of data in the cache to available write locations in the tiered data storage system, etc.

In some approaches, maintaining the dynamic cache size may additionally and/or alternatively include dynamically selecting the cache size based on a latency of destaging extents of data in the cache. Said another way, the cache size may be adjusted in relation to the rate that data can be written from the cache to secondary locations such as tiers of a data storage system. Cache data can be destaged much more quickly to a tier having a lower write latency than to a tier having a relatively higher write latency, and therefore more data can be destaged to the tier having the relatively lower write latency before the power source is depleted.

The relative amounts of data destagable to each tier may also be considered when determining the cache size. This is especially important where the tier having the relatively lower write latency has limited available space. For example, if a tier having lower write latency is able to accept a first quantity of cache data (where the first quantity may be about equal to the available storage space on the tier having the lower write latency), and any remaining cache data is destaged to a tier having relatively higher write latency, the estimated times to destage the cache data to the tiers may be compared to the present expected duration of the temporary power source and the cache size adjusted appropriately (e.g., maximized) so that all cache data can be destaged to the tiers, at their estimated rates, before the temporary power source becomes unable to power the cache.

For context, descriptions of various embodiments and approaches herein regarding tiers having relatively lower write latency and relatively higher write latency may be based on the types of storage media included in the respective tiers. According to one illustrative approach, the tier having relatively higher write latency may include hard disk memory and the tier having relatively lower write latency may include NVRAM. According to another approach, the tier having relatively higher write latency may include magnetic recording tape and the tier having relatively lower write latency may include hard disk memory and/or SSD. In some approaches, one or more tiers of the tiered data storage system may include a single type of storage medium. However, in some other approaches, one or more tiers of the tiered data storage system may include a plurality of different types of storage mediums. Moreover, it may be noted that although in some illustrative approaches herein a tier including magnetic recording tape may be indicated as being a tier with relatively higher write latency, this may not be the case in some other approaches. For example, in some approaches, a tier including magnetic recording tape may be considered the tier with relatively lower write latency, e.g., such as in an approach in which a magnetic recording tape of the tier is mounted to a position of the tape where a next write operation is to begin.

According to one approach, determining the latency of destaging extents of data from the cache may include communicating with firmware of a storage device such as the firmware of a disk drive. According to a more specific approach, the latency of data that is likely be promoted to a tier having relatively lower latency may be determined based on persistent target disk location(s) and characteristics of mediums on which data is stored, e.g., such as a known type of disk characteristics.

Determining the write time for the extents of data in the cache may, according to one approach, include accessing a preexisting mapping. In one example, the mapping may indicate write location(s) of storage locations of the tiered data storage system that are available for storing extents of data to, e.g., free write locations, write locations that can be recaptured for storing cache data, etc. Accordingly, a storage system associated with method 400 may include a mechanism which may be instructed to store this information in the mapping, e.g., see capability monitor 610 of FIG. 6. The mechanism may be configured to communicate with the temporary power source to collect the battery power and dynamically determine data that is scheduled to be/likely to be promoted to the system cache, e.g., based on such data exceeding a predetermined threshold of access frequency. In another approach, the mechanism may additionally and/or alternatively be configured to detect within the dynamically sizeable cache, destage latency as will be described elsewhere herein. Accordingly, the mechanism may be utilized with logic of method 400 in order to resize the cache based on the data location tiers and disk performance parameters, e.g., such as relative latencies of such tiers.

Based on the accessing of the preexisting mapping, in some approaches, at least some of the extents of data stored on both the tier having relatively lower write latency and the tier having relatively higher write latency may be determined. One of such duplicate extents of data residing on a tier having relatively lower write latency may be demoted to only exist on the tier having relatively higher write latency to thereby make write locations of the tier having relatively lower write latency available for writing to. In some approaches, the dynamic cache size may be increased as a result of determining that relatively low latency write resources may be selectively be made available if needed during a power loss event.

As alluded to above, determining the write time for the extents of data in the cache may additionally and/or alternatively include calculating a time for writing a maximum amount of the extents of data in the cache to available write locations of a tier having relatively lower write latency, and writing a remaining amount of the extents of data in the cache to available write locations of a tier having relatively higher write latency. Maximizing the number of writes that are performed on available write locations of the tier having relatively lower write latency, and utilizing available write locations of the tier having relatively higher write latency for the remaining extents of data that are to be destaged from the cache, enables an efficient destage of extents of data from the cache, as a maximum amount of available lower write latency resources are utilized.

With continued reference to operation 404 of method 400, some specific examples for calculating a time for writing the extents of data in the cache to available write locations will now be described. For example, assuming that it is determined that a temporary power source is capable of keeping a cache powered for 3600 milli sec rids (ms), e.g., such as during a power loss event, in some preferred approaches, a cache size of the cache may be dynamically selected/limited such that the extents of data in the cache are capable of being written to at least one other write location of the tiered data storage system (other than the cache) in no more than 3600 ms. In such an example, it may also be assumed that it has been determined that sixty-five write locations of a first storage tier of the tiered data storage system are available for writing to, and at least one-hundred write locations of a second storage tier of the tiered data storage system are available for writing to. Moreover, assume that writing may be performed to the write locations of the first storage tier at a speed of one write location/ms, and that writing may be performed to the write locations of the second storage tier at a speed of one write location/100 ms. In other words, the first storage tier has relatively lower write latency, and the second storage tier has relatively higher write latency. Based on these parameters, the size of the cache may be selected to be 100 blocks. This is based on a determination/calculation that writing extents of data in the cache to the first storage tier will consume sixty-five ms (one write/ms to the sixty-five available write locations of the first tier), and that writing extents of data in the cache to the second storage tier will consume 3,500 ms (one write/100 ms to thirty-five available write locations of the second tier). Note that the predicted write times of the current example would only consume 3,565 ms of the 3600 milliseconds the temporary power source is determined to be capable of powering the cache before the temporary power source is depleted. However, in such an example, the remaining 35 ms that the temporary power source is potentially able to power the cache may serve as an intentionally reserved buffer in case that temporary power source is depleted in less than 3600 milliseconds during a power loss event.

It should be noted that, although the determination in the example above for dynamically selecting the cache size may assume that writes that are performed to available write locations of the first storage tier are performed temporally before the writes that are performed to the available write locations of the first storage tier, in some approaches, the determination may be made incorporating an assumption that writes performed on different storage tiers, such as the first storage tier and the second storage tier, are performed concurrently. In other words, the writes in the above example would be determined to only consume the greater of the two concurrent write times, i.e., 3,500 ms. However, the determination may additionally incorporate the fact that the cache destaging data to concurrent writes may consume more power. Accordingly, in some approaches, the determination of the amount of time that the temporary power source is capable of powering the cache before the temporary power source is depleted may consider a determined number of writes that are anticipated to be concurrently performed during destaging of data from the cache. Of course, in such a determination, the greater the number of anticipated concurrent writes, the less time the temporary power source is expected to be determined to be capable of powering the cache before the temporary power source is depleted.

The caching of write data may in some approaches be performed based on a dynamic constraint that a total amount of power estimated to be consumed in destaging such data is not to exceed the amount of power stored on the temporary power source. The accuracy of this estimation increases as parameters of backend location, e.g., such as the first and second tiers in the example above, are used for maintaining the dynamic cache size. Specifically, a dynamic awareness may be incorporated into method 400 which enables the cache size to be dynamically maintained based on the nature of the backend.

After selecting the cache size, modifications may occur to storage locations of tiers that are used to destage extents of data in the cache. Because states of storage locations of such tiers may be used for selecting the cache size, in some approaches, detection of modification(s) of the storage locations may initiate a reevaluation of the cache size. Accordingly, in order to establish a dynamically selected cache size, method 400 may optionally include detecting modification of at least one write location of a tier that is configured to be utilized to destage extents of data in the cache. Moreover, the cache size may be reselected based on the detected modification, e.g., using one or more of the techniques described elsewhere above for selecting the cache size.

In some approaches, method 400 may optionally include collecting performance data of the temporary power source during a power loss event, e.g., see operation 406. Such performance data of the temporary power source may, in some approaches, include information that may be incorporated into a subsequent determination of the amount of time that the temporary power source is capable of powering the cache before the temporary power source is depleted. For example, according to various approaches, the performance data may include, e.g., discharge time/rate for the temporary power source, temperature of the temporary power source prior to and/or during use, detection of capacity memory effect in a most previous use of the temporary power source, etc.

Optional operation 408 of method 400 includes incorporating the collected performance data in a subsequent determination of an amount of time that the temporary power source is capable of powering the cache before the temporary power source is depleted. For context, in some approaches, incorporating the collected performance data may include, e.g., storing the collected performance data, outputting the collected performance data, etc. According to a more specific approach, incorporating the collected performance data may additionally and/or alternatively include applying a most previously recorded discharge time of the temporary source in an algorithm, e.g., a known type of algorithm for determining the amount of time that the temporary power source is capable of powering a device such as a cache. According to another approach, incorporating the collected performance data may include subtracting a predefined amount of time from the most previously recorded discharge time, and using the difference of the time values as the determined amount of time that the temporary power source is capable of powering the cache.

There are numerous benefits that may result from utilizing method 400 in a tiered data storage system. Such benefits are particularly apparent when considering the state of caches of conventional data storage systems. For example, in conventional data storage systems, during normal operation of temporary power sources of the storage system, a virtualization engine may keep a smaller amount of cache in the storage nodes of the cache than the nodes are capable of storing. However, this set storage amount for these nodes is often much less data than an actual capacity at the initial period of the life of the cluster nodes. This is due to consideration of the battery life draining over time, e.g., over a period of the subsequent few years, and/or other unexpected destaging delays. In sharp contrast, various embodiments and approaches described herein, such as those of method 400, include dynamically selecting a size of a cache of a tiered data storage system based on one or more metrics of the tiered data storage system, such as, e.g., relative latencies of different tiers of the tiered data storage system, past performance of the temporary battery source, duplicate copies of an extent of data existing in more than one tier of the tiered data storage system, etc. Consideration of these metrics for determining a cache size allows for a relatively greater utilization of the total storage capacity of the cache than is otherwise utilized in conventional tiered data storage systems that include a cache.

These benefits are also realized because there are conventionally no techniques for determining where data is located in the backend disk type of tiered data storage system, such as in order to update a dynamic resizable write cache of storage nodes as described herein. Accordingly, all data contents of the cache of conventional tiered data storage systems are typically written out to tiers of the tiered data storage systems upon experiencing a power loss event, without consideration as to whether there are duplicate extents of data that exist on tiers of the data storage system. In view of various of the embodiments and approaches described herein however, this conventional approach may prove inefficient, as this destaging does not consider where such extents of data may already reside within the tiered data storage system. In sharp contrast, in some embodiments and approaches herein, a dynamic cache size may be selected based on a latency of destaging extents of data in the cache. This is because data that is located at an NVRAM-based storage location at the backend may require less time to flush while the cached contents having base location as Near-Line drives may require more time to flush. This impacts the destage power in cases of an emergency situation, e.g., increases the amount of destage power that is consumed in flushing extents of data from the cache. However, the dynamic cache size selection described herein potentially allows more data to be stored in the cache (based on the enabled relatively faster destaging of extents of data from cache), which as a result improves performance, efficiencies and capabilities of the tiered data storage system. Moreover, this promotes a cost-effective tiered data storage system, as a smaller cache and/or temporary power source may be utilized than would otherwise be used in conventional systems (based on the enabled relatively faster destaging of extents of data from cache).

Figure 5:
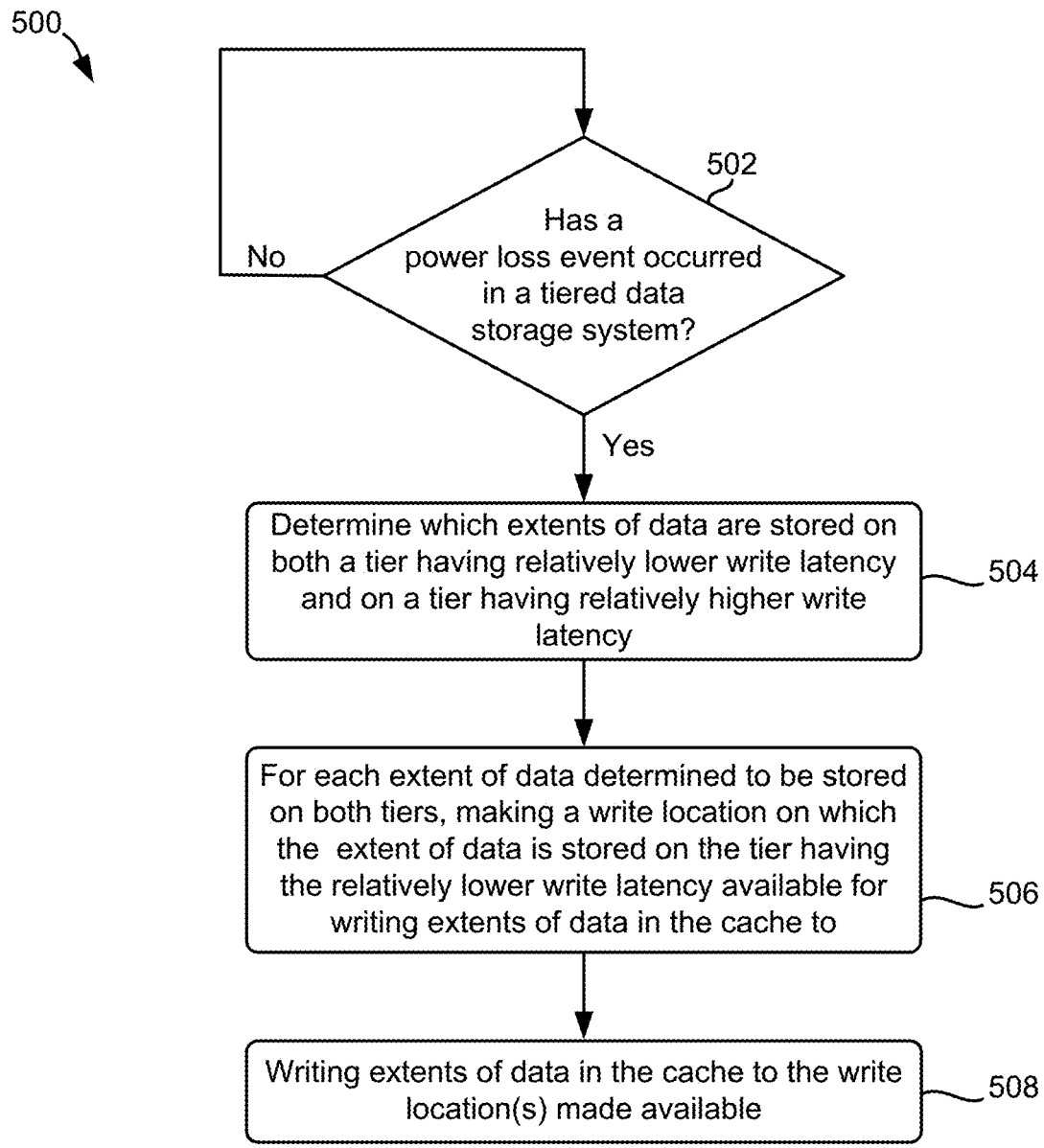
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-4 and 6-7C, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

In the current embodiment, method 500 includes performing a destaging process. The destaging process may in some approaches be performed in response to determining that a power loss event has occurred in a tiered data storage system that includes a cache that is configured to be powered by a temporary power source during a power loss event. For example, as illustrated in decision 502, method 500 may include detecting for occurrence of a power loss event in the tiered data storage system. It may be considered important to destage extents of data from a cache during a power loss event of a tiered data storage system, because a loss of power to a cache may result in an unrecoverable loss of extents of data that existed in the cache prior to the cache losing power. Accordingly, for various approaches in which the temporary power source is configured to power the cache during a destaging process, e.g., such as that of method 500, the destaging process is preferably configured to be completed during the power loss event before the temporary power source is depleted. In some approaches, this may be achieved by utilizing method 400 for maintaining a dynamic cache size that is capable of powering the cache during destaging of extents of data from the cache to tiers of a tiered data storage system.

With continued reference to method 500, in one approach, in response to detecting that a power loss event has occurred in a tiered data storage system that includes the cache, the destaging process includes determining which extents of data are stored on both a tier having relatively lower write latency and a tier having relatively higher write latency, e.g., see operation 504 of method 500.

In some approaches, determining which extents of data are stored on both tiers may include determining the base location of data that has previously been migrated through tiers, e.g., such as to the cache, based on the data being relatively more frequently used in write operations of host applications. Note that the base location of data may refer to the location of data within tiers of the tiered data storage system. In one specific approach, it may be determined that a base location of data is within at least one storage location of the tiered data storage system based on a previous access frequency of the data and/or how recently the data was added to the cache. For example, the base location of a given extent of data may be determined to be a tier having relatively lower write latency based on the given extent of data being accessed within a predetermined range of frequency within a predetermined amount of time. In other words, in such an example, without confirming that the given extent of data actually exists in the tier having relatively lower write latency, the given extent of data may be determined to be in the tier having relatively lower write latency based on the given extent of data having a predetermined prior access frequency, e.g., within one or more host applications.

According to some other approaches, determining which extents of data are stored on both tiers may include accessing at least one preexisting mapping, e.g., such as a virtualization map of the tiered data storage system. More specifically, in one approach, the preexisting mapping may be a virtualization map of the tiered data storage system, that may logically detail all the storage locations of extents of data within the tiered data storage system. In another approach, the preexisting mapping may be a duplication map that indicates the location of duplicated extents of data in the tiered data storage system.

In some approaches, the mapping may include one or more extents of data of a given tier of the tiered data storage system that is no longer listed in a logical directory of the given tier. For example, the mapping may include a first extent of data that was previously migrated to/copied to a tier having relatively lower write latency (a tier having relatively faster destage capabilities) of the tiered data storage system from a tier having relatively higher write latency (a tier having relatively slower destage capabilities) of the tiered data storage system. In such an example, although a directory of the tier having relatively higher write latency may no longer include the first extent of data, despite being migrated to the tier having relatively lower write latency, the first extent of data may remain intact (as a valid copy) on the tier having relatively higher write latency. It may be determined from the mapping that the first extent of data is stored on a tier having relatively lower write latency and on a tier having relatively higher write latency.

For at least some extents of data determined to be stored on both a tier having relatively lower write latency and on a tier having relatively higher write latency, in some approaches, one or more write locations on which at least some extents of data are stored on the tier having the relatively lower write latency may be made available for writing at least some extents of data in the cache to, such as during the destaging process, e.g., see operation 506 of method 500. For purposes of an illustrative example, assume that a given extent of data is determined to be stored on a tier having relatively higher write latency and not on a tier having relatively lower write latency. In one approach, during a detected power loss event, one or more extents of data in the cache may be written to available write locations of the tier having relatively lower write latency. It should be noted that this write may be optionally based on a copy of the given extent of data already existing on the tier having relatively higher write latency. However, writing the one or more extents of data on the tier having relatively lower write latency may potentially enable the written one or more extents of data to be migrated back to the cache, e.g., after power is resumed in the tiered data storage system, in relatively less time than the amount of time that it would take for the one or more extents of data to be migrated to the cache from the tier having relatively higher write latency. In other words, the writing of the one or more extents of data to the tier having relatively lower write latency may in one approach be performed based on an assumption that such extents of data will be accessed/requested at a rate (after the power is resumed) that would result in the one or more extents of data being promoted to the cache.

Although some approaches herein include making one or more write locations on which the extents of data are stored on the tier having the relatively lower write latency available for writing, in some other approaches, one or more write locations on which the extents of data are stored on the tier having the relatively higher write latency may additionally and/or alternatively be available for writing.

Making a write location of a tier having relatively lower write latency available for writing at least some extents of data in the cache may in some approaches include modifying a mapping, e.g., such as the virtualization map mentioned elsewhere herein (see operation 504). For example, the modification may include modifying a virtualization map, and more particularly modifying extents of the map that are copied traversing a duplication map. In another approach, the modification may include logically setting (within the mapping) the write location that includes the duplicate extent of data to free and/or reclaimable storage space. Based on making the modification to the mapping, cache contents may be destaged to/written to the write locations made available in the tier having relatively lower write latency, e.g., see operation 508 of method 500. At least some extents of data determined to be stored on both tiers may be overwritten on the tier having relatively lower write latency during the writing.

Making resources of a tier having relatively lower write latency available improves destage efficiency, as the cache may be flushed to a faster performing tier in relatively less time and utilizing relatively less power than the time/power that would otherwise be expended in flushing extents of data from the cache to the tier having relatively higher write latency. Moreover, this may potentially reduce data loss situations in cases of a malfunctioning temporary power supply, as the data is destaged more quickly per unit of time.

It may be noted that in one or more approaches of method 500, in response to detecting a power loss event, duplicate extents of data may be effectually discarded. For example, a duplicate extent of data that is stored on locations of the tiered data storage system including on a tier having relatively higher latency and on a tier having relatively lower write latency, is effectually discarded from the tier having relatively lower write latency. This is because in the present example, write locations of the tier having relatively lower write latency that have one of the duplicate extents of data stored thereon are made available. This enables a relatively more efficient tiered data storage system than conventional tiered data storage systems which typically flush all data from a cache to other data storage locations without considering whether extents of data exist on more than one tier of such data storage systems.

In one approach, at least some extents of data in the cache determined to be stored at at least one storage location may not be migrated from the cache. These extents of data may not be migrated from the cache as they already exist at at least one other storage location of the tiered data storage system. In one approach, this determination to not destage such extents of data from the cache may be based on a determination that the extents of data not migrated from the cache were not previously updated to a state that is not already stored on a tier of the data storage system. Accordingly, pointers may be updated to specify, e.g., within the preexisting mapping, the current location of extents of data that are not migrated from the cache. Subsequent to power being resumed to the tiered data storage system, extents of data having to which such pointers are directed may be migrated to the cache. The processing resources and the temporary power source resources that are not expended in otherwise migrating these extents of data to another storage location of the tiered data storage system are thereby preserved.

In some approaches, the techniques of method 500 may be implemented in a tiered data storage system with the techniques of method 400. In some approaches, the determined availability of write locations in a tier having relatively lower write latency for writing at least some extents of data in the cache to (based on duplicated extents of data existing in the tier having relatively lower write latency and a tier having relatively higher write latency) may be used for maintaining a dynamic cache size. For example, a dynamic resizable battery-backed caching module configured to perform method 400 and/or method 500 may utilize such information for determining when to utilize/preserve duplicate extents on the tier having relatively higher write latency, e.g., such as in response to detecting a power loss event. This may increase the write cache size, as resources, e.g., write locations, of tiers having relatively lower latency are readily available for writing to in a power loss event. For example, assume that 10 gigabytes (GB) of Near-Line Small Computer System Interface (NL-SCSI) data is duplicated in a tier having relatively higher write latency and a tier having relatively lower write latency. Based on this duplication, in response to a predetermined emergency mode destage trigger being detected, e.g., such as detecting that a power loss event has occurred, the 10 GB write location on the tier having the relatively lower write latency which contains the data may be made available for receiving data from the cache, while the copy of the 10 GB of data stored on the tier having the relatively higher write latency is saved. In some approaches, this may include deallocating the 10 GB extent of data stored on the tier having the relatively lower write latency, and updating/generating a pointer to point to the copy of the extent of data stored on the tier having the relatively higher write latency. Assuming that the 10 GB of write locations are located on NVRAM, this results in an additional 10 GB extent of NVRAM write locations that would not have been otherwise available without determining the duplicate extents of the data. Based on freeing the 10 GB extent of storage on the tier having the relatively lower write latency, method 500 may include instructing extents of data in the cache to be destaged to the 10 GB of write locations on the tier having the relatively lower write latency, based on such write locations being made available. In some approaches, such a freeing of memory modules having a relatively lower latency may be performed during the resizing of the dynamic cache size.

In order to implement the techniques of method 500 with the techniques of method 400 in a tiered data storage system, in some approaches, communication between a cache resizing module and tiering daemons may be performed using a known type of in-bound and out-of-bound application program interface (API) architectures. According to one approach, an in-bound implementation may use existing protocol fields such as small computer system interface command descriptor block (SCSI CDB) or non-volatile memory express (NVMe) data descriptors. The out-of-bound protocols may in some approaches use a central host or computing entity to communicate between the elements. Upon detecting an external power supply failure, a signal may be transferred to the cache to initiate an emergency destage process, and actions may be taken by sending inter-module communication coupling signals to respective components in order to avoid a data loss situation. Furthermore, during normal data caching, information may be fetched to determine the capacity of a cache based on the base location tiering, related latency times, and duplicate contents in a tier having relatively lower write latency. As a result, performance of the tiered data storage system is ensured to be efficient, as a maximum amount of low write latency write resources are utilized in emergency destaging. As mentioned elsewhere herein, this efficiency is not otherwise available in conventional tiered data storage systems that include a cache that is configured to be powered by a battery during power loss events. This is because these conventional resizable caches have a limited perspective in that they do not consider the locations that can be made available for data destaging to during an emergency such a detected power loss event.

In some approaches, a size of the extents of data that are to be destaged from the cache may be greater than a storage size of the write locations currently unoccupied, in addition to those made available, in a tier having relatively lower write latency. In one or more of such approaches, method 500 may include writing a first portion of the extents of data of the cache to the write locations made available, and writing a second portion of the extents, e.g. a remaining portion of the extents, to available write locations of another tier, e.g., such as the tier having relatively higher write latency.

The writing of the extents of data in the cache to write locations of one or more tiers of the tiered data storage system may, in some approaches, be performed according to an applied predetermined priority scheme. Depending on the approach, the predetermined priority scheme may include one or more conditions. For example, in one approach, a condition of the predetermined priority scheme includes writing at least some of the extents of data in the cache to the write location made available according to previous relative frequency of access statistics of the at least some of the extents of data. In such an approach, performing writes according to the predetermined priority scheme may include writing a first portion of the extents of data first in response to the first portion of the extents having a relatively higher frequency of access within a previous predetermined period of time, e.g., relatively higher than a second portion of the extents, relatively higher than a predetermined access frequency threshold, etc. In contrast, in such an approach, the predetermined priority scheme may include writing the second portion of the extents of data, e.g., the remaining extents of data in the cache, second in response to the second portion of the extents having a lower relative frequency of access within the previous predetermined period of time, e.g., relatively lower than the first portion of the extents, relatively lower than a predetermined access frequency threshold, etc.

According to another approach, a condition of the predetermined priority scheme may include writing a maximum amount of the extents of data in the cache to available write locations of the tier having relatively lower write latency, and writing a remaining amount of the extents of data in the cache to available write locations of the tier having relatively higher write latency.

According to yet another approach, a condition of the predetermined priority scheme may include writing extents of data in the cache to available write locations according to the size of the extents, e.g., writing according to an order of descending extent size, writing according to an order of increasing extent size, writing extents according to predetermined thresholds, etc.

In some approaches, after data in the cache has been written to write locations of the tiers, the tiered data storage system may be shut down in order to avoid damage occurring to any hardware of the system that might be otherwise be damaged as a result of the temporary power source shutting off suddenly.

There are numerous benefits that result from utilizing method 500 in a tiered data storage system. For example, it should be noted that administrators of tiered data storage systems typically place guarantees on the security/safety of customer data that is trusted to be stored in such systems, and in some approaches agree to a penalty in case of data loss. Accordingly, it is very important for tiered data storage system administrators to ensure and optimize safety of the data, especially during power loss events. Utilizing various embodiments and/or approaches described herein, customer data stored on tiered data storage systems is much less likely to be lost in a power loss event, because it is secured on a cache with a dynamically selected size that is backed by a temporary power source. Moreover, upon experiencing a power loss event, cache writes are efficiently destaged based on the consideration of all backend tier location(s) of extents of data in the cache.

This consideration of backend tier locations is beneficial to destaging efficiency because write data of the cache is able to be destaged to write locations of a tier having relatively lower write latency, based on the discarding of extents on the tier that are duplicated on a different tier having relatively higher write latency. This prevents data loss situations and protects high value business-critical data. Moreover, this reduces the relative number of I/O's from cache to storage tiers having relatively higher write latencies in case of power loss events. Accordingly, a time gain is achieved as extents of data may be destaged to low latency storage that is made available as a result of utilizing techniques described herein. Gains to application performance are also achieved as a result of resizing the cache size and ensuring that the selected cache size allows access to storage tiers having relatively lower write latency, e.g., tier 0 data locations. Moreover, the techniques of method 400 and method 500 may not call for any additional hardware/software requirements to be added to a tiered data storage system, and therefore various embodiments and approaches described herein provide a cost-effective solution for increasing relative performance and efficiency in tiered data storage systems.

Figure 6:
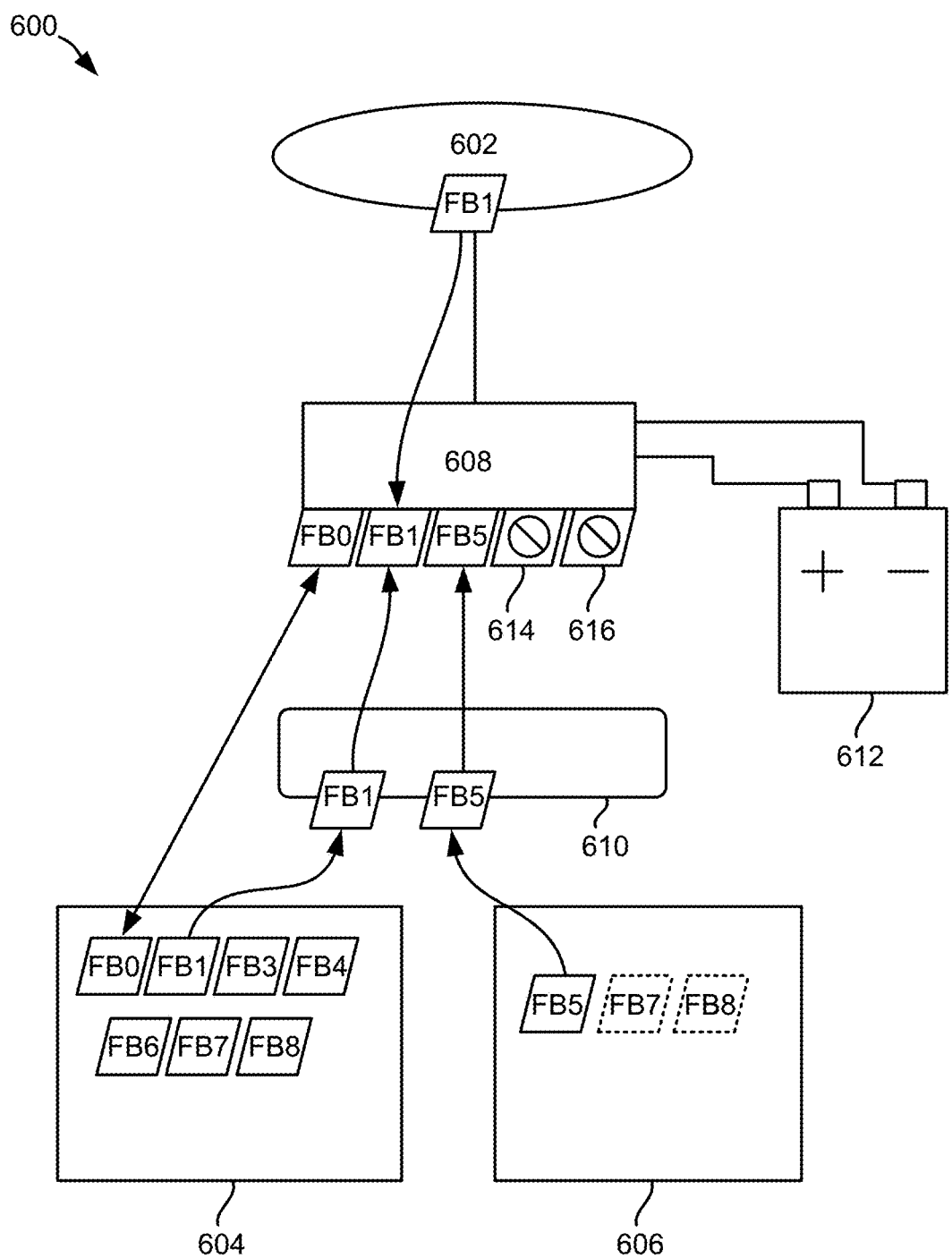
FIG. 6 is a diagram of a tiered data storage system, in accordance with one embodiment.

FIG. 6 depicts a tiered data storage system 600, in accordance with one embodiment. As an option, the present tiered data storage system 600 may be implemented in conjunction with features from any other embodiment listed herein, such as those described with reference to the other FIGS. Of course, however, such tiered data storage system 600 and others presented herein may be used in various applications and/or in permutations which may or may not be specifically described in the illustrative embodiments listed herein. Further, the tiered data storage system 600 presented herein may be used in any desired environment.

The tiered data storage system 600 includes a user program 602. The user program 602 may be a known type of user program, and may be configured to access various extents of data stored in tiers of the tiered data storage system 600. For example, extents of data FB0, FB1, FB3, FB4, FB6, FB7, and FB8 are stored in a tier 604 having relatively lower write latency, while extent of data FB5, FB7, and FB8 are stored in a tier 606 having relatively higher write latency. In one approach, the extents of data FB7, and FB8 on the tier 606 may be extents of data that were previously promoted to the tier 604, but still remain intact on the tier 606, e.g., indicated by the dashed contour of the extents of data FB7, and FB8 on the tier 606.

In one approach, depending on the frequency of access to one or more of the extents of data, various extents of data may be migrated from the tiers 604, 606 to a cache 608 of the tiered data storage system 600. For example, in one approach, the extents of data FB1 and FB5 are migrated from the tiers 604, 606 to the cache 608, from which the user program 602 may access extents of data from with relatively little latency.

In the current approach, the cache 608 is configured to be powered by a temporary power source 612 during a power loss event. Moreover, extents of data that are promoted to the cache 608 may be controlled by a capability monitor 610. In some approaches, the capability monitor 610 may be configured to manage the cache 608. A cache to logical block address mapping between extents of data stored in the cache 608 and extents of data stored on the tiers 604, 606 may be stored in the tiered data storage system 600. In some approaches the managing may include determining an amount of time that the temporary power source 612 is capable of powering the cache 608 before the temporary power source 612 is depleted. This may be accomplished using any one or more of the techniques described elsewhere herein, e.g., see method 400. Moreover, the capability monitor 610 may be configured to at least in part determine which extents of data to keep in the cache 608 at any given time, e.g., based on relative access frequencies. During such determinations, in some approaches, the capability monitor 610 may be configured to collect information that may be used to determine an amount of data that is capable of being be flushed from the cache 608 before the temporary power source 612 is depleted. This determination may additionally incorporate any other related latency requirements of each of the extents of data. For example, such a determination may include determining an extent of resources of the tier 604 having relatively lower write latency and/or of the tier 606 having relatively lower write latency that are available for using in a destaging process. Based on such a determination, a time for destaging the extent of data FB1 from the cache 608 may be determined.

The capability monitor 610 may additionally and/or alternatively be configured to maintain a dynamic cache size of the cache. In some approaches, the maintaining may include dynamically selecting the cache size based on the amount of time that the temporary power source 612 is capable of powering the cache 608 before the temporary power source 612 is depleted. Such a determination may be additionally and/or alternatively based on a latency of destaging extents of data in the cache. For example, it may be noted that some write locations of the cache are set as being unavailable, e.g., see write locations 614, 616. Such write locations 614, 616 may be set as being unavailable in response to a determination that the temporary power source 612 would otherwise not be capable of powering the cache 608 before the temporary power source 612 is depleted if the write locations 614, 616 contained extents of data. Note that this dynamic sizing of cache is based on the location of extents of data in the tiers 604, 606 of the tiered data storage system. For example, as extents of data FB1 and FB5 are migrated to the cache 608 based on requests from the user program 602 write locations 614, 616 are marked as being unavailable/invalidated based on a determination that destaging the extent of data FB5 to the tier 604 having relatively lower write latency consumes the same time that writing three extents of data to the tier 606 having relatively higher write latency will consume. The dynamic cache size may additionally be selected based on a determination that the remaining extents of data of the cache, i.e., FB0 and FB1, are able to be destaged from the cache 608 to the tier 604 in an amount of time that the temporary power source 612 is capable of powering the cache 608 before the temporary power source is depleted.

In one approach, the dynamic cache size of the cache 608 may be thereafter increased, e.g., increased to include one or more of the write locations 614, 616, in response to additional write locations of the tier 604 becoming available. For context, this is because write locations of the tier 604 becoming available will increase the relatively low latency write resources available for destaging the cache. This ensures that a capacity of the cache is not filled to an extent that is not capable of being flushed before the temporary power source 612 is depleted. This also avoids indirect battery backed cache inflation which may otherwise present issues during emergency destaging of the cache during a power loss event, and thereby provides reliability to saving application data.

Maintaining a dynamic cache size of the cache may additionally consider whether extents of data stored on the tier 604 having relatively lower write latency are also stored at the tier 606 having relatively higher write latency. For example, note that extents of data FB7 and FB8 are stored at both the tiers. Accordingly, in some approaches, the dynamic cache size may be increased in response to a determination that the write locations of the tier 604 on which the extents of data FB7 and FB8 are stored may be made available for writing extents of data in the cache 608 to during the destaging process. This is because the extents of data FB7 and FB8 may be preserved on the tier 606, while the relatively low write latency write locations previously containing the extents of data FB7 and FB8 are made available.

Figure 7A:
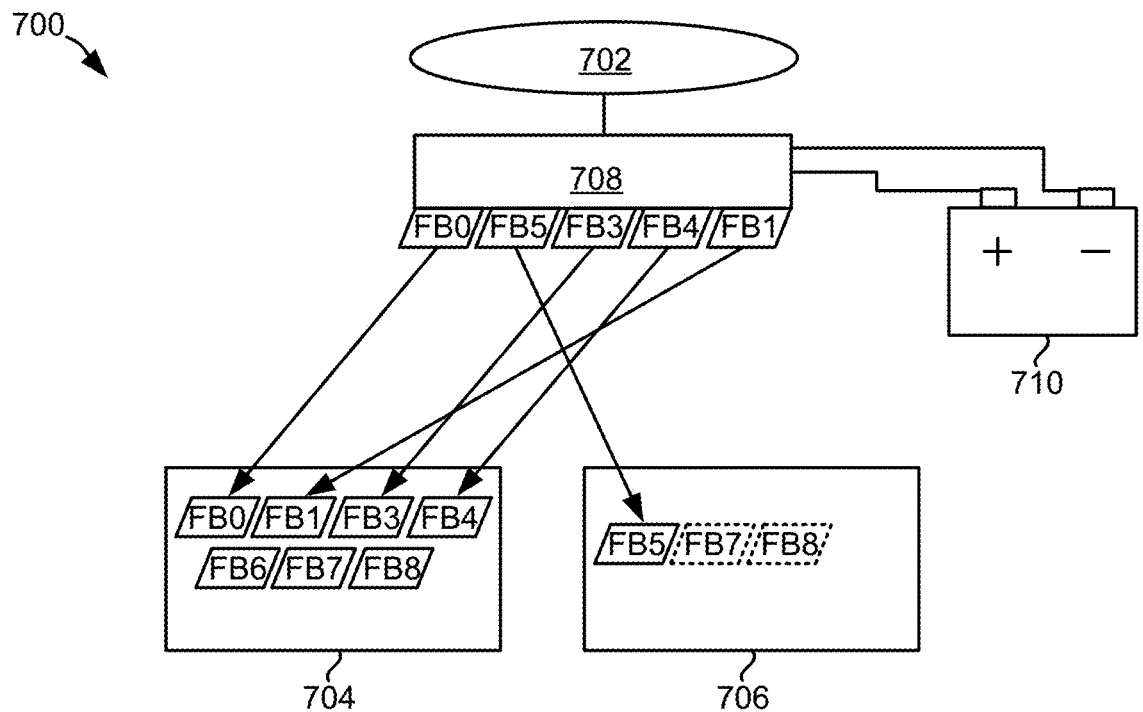
FIG. 7A is a diagram of a tiered data storage system before detection of a power loss event, in accordance with one embodiment.
Figure 7B:
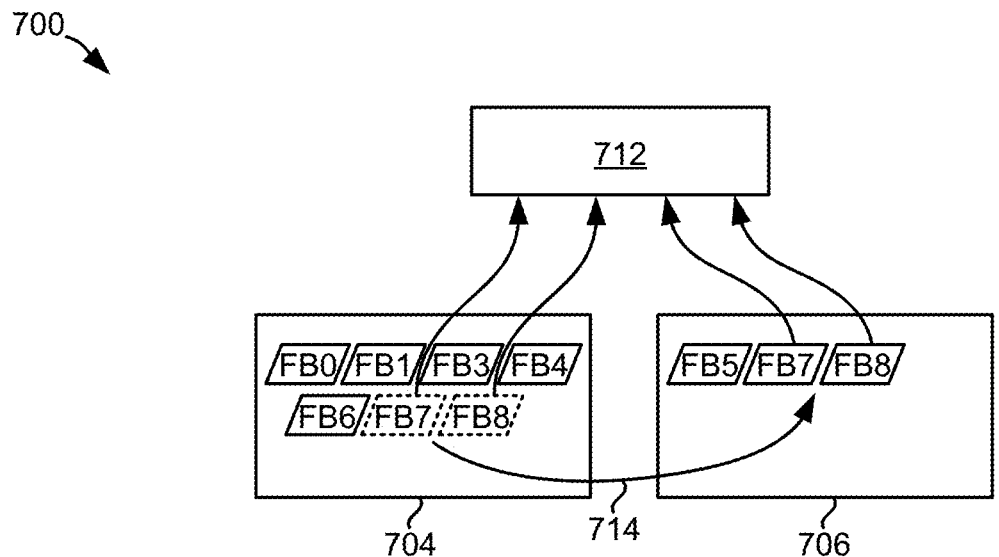
FIG. 7B is a detailed view of the storage tiers of the tiered data storage system of FIG. 7A and a virtualization map.
Figure 7C:
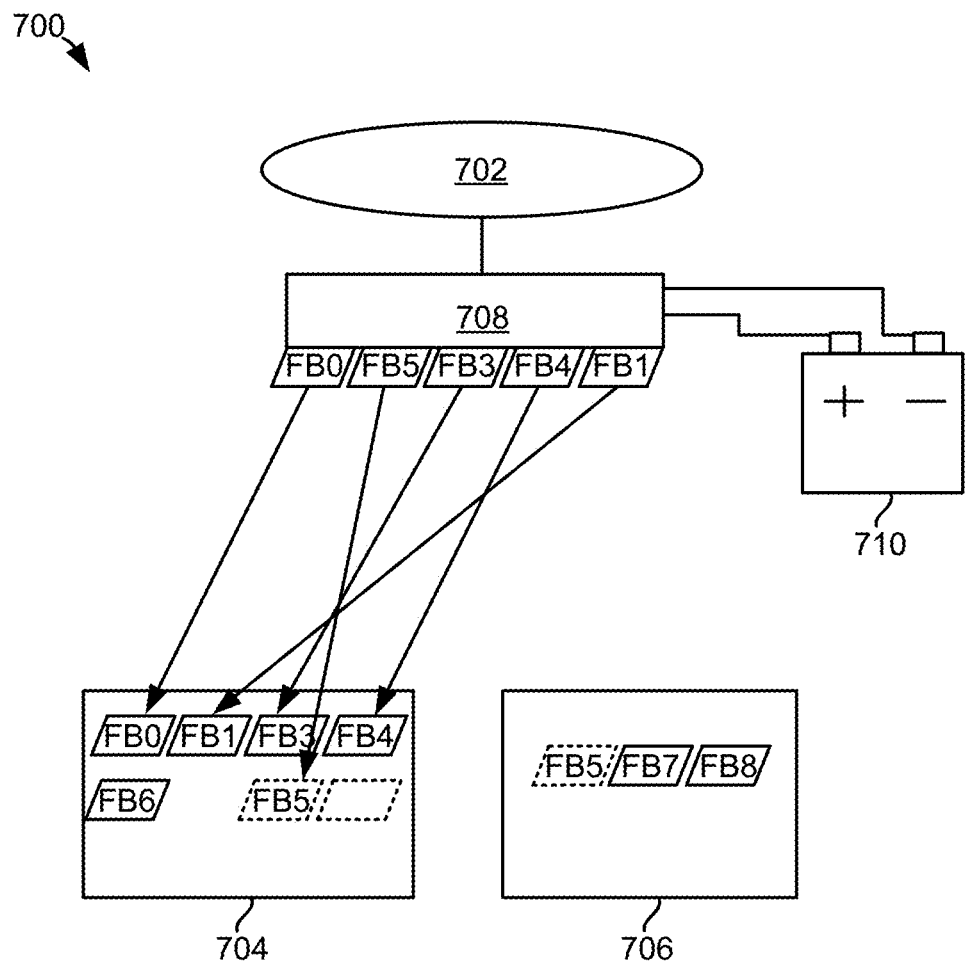
FIG. 7C is a depiction of the tiered data storage system of FIG. 7A after data is destaged is performed on the cache in response to detecting a power loss event.

FIGS. 7A-7C depict a tiered data storage system 700, in accordance with one embodiment. As an option, the present tiered data storage system 700 may be implemented in conjunction with features from any other embodiment listed herein, such as those described with reference to the other FIGS. Of course, however, such tiered data storage system 700 and others presented herein may be used in various applications and/or in permutations which may or may not be specifically described in the illustrative embodiments listed herein. Further, the tiered data storage system 700 presented herein may be used in any desired environment.

Referring first to FIG. 7A, the tiered data storage system 700 includes a user program 702. The user program 702 may be a known type of user program, and may be configured to access various extents of data stored in tiers of the tiered data storage system 700. For example, extents of data FB0, FB1, FB3, FB4, FB6, FB7, and FB8 are stored in a tier 704 having relatively lower write latency, while extents of data FB5, FB7, and FB8 are stored in a tier 706 having relatively higher write latency. In one approach, the extents of data FB7, and FB8 on the tier 706 may be extents of data that were previously promoted to the tier 704, but still remain intact on the tier 606, e.g., indicated by the dashed contour of the extents of data FB7, and FB8 on the tier 706.

The tiered data storage system 700 moreover includes a cache 708 that is configured to be powered by a temporary power source 710, e.g., such as during a power loss event. In the current approach the cache 708 includes a plurality of extents of data, e.g., see FB0, FB5, FB3, FB4, and FB1. A cache to logical block address mapping (see arrows in FIG. 7A) between extents of data stored in the cache 708 and extents of data stored on the tiers 704, 706 may be stored in the tiered data storage system 700. The extents of data FB0, FB5, FB3, FB4, and FB1 are mapped to their corresponding base location of the tiers 704, 706. During normal operations, e.g., while a power loss event is not occurring, data may be written from the cache 708 to and from the base locations, such as during promotion and demotions of extents of data.

The data in the cache may destaged upon detection of a power loss event. For example, note that in FIG. 7A, the tiered data storage system 700 is illustrated before occurrence of a power loss event, while FIGS. 7B-7C depict the tiered data storage system 700 during and/or subsequent a power loss event occurring. Referring now to FIG. 7B, upon a power loss event occurring, duplicate extents of data that are not part of the caching may be identified. The logical location of the identified duplicate extents of data may updated in a logical mapping, e.g., see virtualization map 712. For example, the extents of data FB7 and FB8 may be determined to be stored on both a tier having relatively lower write latency, i.e., tier 704, and on a tier having relatively higher write latency, i.e., tier 706. Based on such a determination, one or more write locations, e.g., see dashed write locations of the tier 704, on which the extent of data is stored on the tier 704 having the relatively lower write latency may be made available for writing extents of data in the cache 708 to during an emergency destaging process. For example, arrow 714 indicates that the virtualization map 712 is updated such that the extents of data FB7 and FB8 are preserved on the tier 706.

Referring now to FIG. 7C, subsequent write locations of the tier 704 having relatively lower write latency being made available based on the updating of the virtualization map 712 for duplicate extents of data, in the one approach, extents of data in the cache 708 may be written to the write locations made available, i.e., the dashed write locations of the tier 704 in FIG. 7C. This reduces the overall latency of destaging data from the cache 708 during a power loss event, because without the virtualization map being updated, the write locations of the tier 704 made available would not otherwise be able to be utilized. Instead, write locations of the tier 706 having relatively higher write latency would likely be utilized, which would in comparison increase the relative latency of the destaging process. Accordingly, using techniques described herein, relatively more data may be flushed from a cache within the period of time that the temporary power source is able to power the cache before being depleted. Accordingly, data loss is avoided, and relatively more tolerance is achieved. In some approaches, subsequent extents of data being written from the cache to the write locations made available, the virtualization map of the tiered data storage system 700 may be updated to reflect the data writes, in order to ensure system consistency after recovery from the detected power loss event.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
managing a cache in a tiered data storage system, wherein the cache is configured to be powered by a temporary power source during a power loss event, wherein the managing includes:
determining an amount of time that the temporary power source is capable of powering the cache before the temporary power source is depleted, and
maintaining a dynamic cache size, wherein the maintaining includes dynamically selecting the cache size based on the amount of time that the temporary power source is capable of powering the cache before the temporary power source is depleted, and based on a latency of destaging extents of data in the cache.

2. The computer-implemented method of claim 1, wherein maintaining a dynamic cache size includes:
determining a write time for the extents of data in the cache, wherein determining the write time includes:
accessing a preexisting mapping of the tiered data storage system, wherein the mapping indicates write location(s) of storage locations of the tiered data storage system that are available for storing extents of data to, and storage locations of extents of data that are stored on both a tier having relatively lower write latency and a tier having relatively higher write latency,
determining at least some of the extents of data stored on both tiers to demote to only exist on the tier having relatively higher write latency, and
calculating a time for writing a maximum amount of the extents of data in the cache to available write locations of the tier having relatively lower write latency, and for writing a remaining amount of the extents of data in the cache to available write locations of the tier having relatively higher write latency.

3. The computer-implemented method of claim 1, comprising:
collecting performance data of the temporary power source during a power loss event; and
incorporating the collected performance data in a subsequent determination of an amount of time that the temporary power source is capable of powering the cache before the temporary power source is depleted.

4. The computer-implemented method of claim 1, comprising:
detecting modification of at least one write location of a tier that is configured to be utilized to destage extents of data in the cache during a power loss event; and
reselecting the cache size based on the detected modification.

5. A computer-implemented method, comprising:
performing a destaging process in response to determining that a power loss event has occurred in a tiered data storage system that includes a cache that is configured to be powered by a temporary power source during a power loss event, wherein the destaging process includes:
determining which extents of data are stored on both a tier having relatively lower write latency and a tier having relatively higher write latency, and
for each extent of data determined to be stored on both tiers, making a write location on which the extent of data is stored on the tier having the relatively lower write latency available for writing extents of data in the cache to during the destaging process.

6. The computer-implemented method of claim 5, comprising:
writing extents of data in the cache to the write location(s) made available,
wherein at least some extents of data determined to be stored on both tiers are overwritten on the tier having relatively lower write latency during the writing.

7. The computer-implemented method of claim 5,
wherein a predetermined priority scheme is applied during writing extents of data in the cache to the write location(s) made available,
wherein a condition of the predetermined priority scheme includes writing at least some of the extents of data in the cache to the write location(s) made available according to previous relative frequency of access statistics of the at least some of the extents of data.

8. The computer-implemented method of claim 5,
wherein a predetermined priority scheme is applied during writing extents of data in the cache to the write location(s) made available,
wherein a condition of the predetermined priority scheme includes writing a maximum amount of the extents of data in the cache to available write locations of the tier having relatively lower write latency, and writing a remaining amount of the extents of data in the cache to available write locations of the tier having relatively higher write latency.

9. The computer-implemented method of claim 5, wherein the tier having relatively higher write latency includes hard disk memory, wherein the tier having relatively lower write latency includes non-volatile random access memory.

10. The computer-implemented method of claim 5, wherein the tier having relatively higher write latency includes magnetic recording tape, wherein the tier having relatively lower write latency includes hard disk memory.

11. The computer-implemented method of claim 5, wherein the destaging process is configured to be completed during the power loss event before the temporary power source is depleted.

12. A computer program product for logical management of a destage process and dynamic cache size of a cache of a tiered data storage system, the computer program product comprising a computer readable storage medium having program instructions embodied therewith, the program instructions readable and/or executable by a controller to cause the controller to:
manage, by the controller, a cache in a tiered data storage system, wherein the cache is configured to be powered by a temporary power source during a power loss event, wherein the managing includes:
determining an amount of time that the temporary power source is capable of powering the cache before the temporary power source is depleted, and
maintaining a dynamic cache size, wherein the maintaining includes dynamically selecting the cache size based on the amount of time that the temporary power source is capable of powering the cache before the temporary power source is depleted, and based on a latency of destaging extents of data in the cache.

13. The computer program product of claim 12, wherein maintaining a dynamic cache size includes:
- determining a write time for the extents of data in the cache, wherein determining the write time includes:
  - accessing a preexisting mapping of the tiered data storage system,
    - wherein the mapping indicates write location(s) of storage locations of the tiered data storage system that are available for storing extents of data to, and storage locations of extents of data of the cache that are stored on a tier having relatively lower write latency and a tier having relatively higher write latency,
  - determining at least some of the extents of data stored on the tier having relatively lower write latency and the tier having relatively higher write latency to demote to only exist on the tier having relatively higher write latency, and
  - calculating a time for writing a maximum amount of the extents of data to available write locations of the tier having relatively lower write latency, and writing a remaining amount of the extents of data in the cache to available write locations of the tier having relatively higher write latency.

14. The computer program product of claim 12, the program instructions readable and/or executable by the controller to cause the controller to:
- perform, by the controller, a destaging process in response to determining that a power loss event has occurred in the tiered data storage system, wherein the destaging process includes:
  - determining which extents of data are stored on both a tier having relatively lower write latency and a tier having relatively higher write latency, and
  - for each extent of data determined to be stored on both tiers, making a write location on which the extent of data is stored on the tier having the relatively lower write latency available for writing extents of data in the cache to during the destaging process.

15. The computer program product of claim 14, the program instructions readable and/or executable by the controller to cause the controller to:
- write, by the controller, extents of data in the cache to the write location(s) made available,
- wherein at least some extents of data determined to be stored on both tiers are overwritten on the tier having relatively lower write latency during the writing.

16. The computer program product of claim 14,
- wherein a predetermined priority scheme is applied during writing extents of data in the cache to the write location(s) made available,
- wherein a condition of the predetermined priority scheme includes writing at least some of the extents of data in the cache to the write location(s) made available according to previous relative frequency of access statistics of the at least some of the extents of data.

17. The computer program product of claim 14,
- wherein a predetermined priority scheme is applied during writing extents of data in the cache to the write location(s) made available,
- wherein a condition of the predetermined priority scheme includes writing a maximum amount of the extents of data in the cache to available write locations of the tier having relatively lower write latency, and writing a remaining amount of the extents of data in the cache to available write locations of the tier having relatively higher write latency.

18. The computer program product of claim 14, wherein the tier having relatively higher write latency includes hard disk memory, wherein the tier having relatively lower write latency includes non-volatile random access memory.

19. The computer program product of claim 14, wherein the tier having relatively higher write latency includes magnetic recording tape, wherein the tier having relatively lower write latency includes hard disk memory.

20. The computer program product of claim 14, wherein the destaging process is configured to be completed during the power loss event before the temporary power source is depleted.

* * * * *